(12) United States Patent
Yan et al.

(10) Patent No.: US 12,158,447 B2
(45) Date of Patent: Dec. 3, 2024

(54) WEAR MONITORING METHOD OF POLYMER THRUST BEARING BASED ON ULTRASONIC REFLECTION COEFFICIENT AMPLITUDE SPECTRUM (URCAS)

(71) Applicant: WUHAN UNIVERSITY OF TECHNOLOGY, Hubei (CN)

(72) Inventors: Xinping Yan, Hubei (CN); Changxiong Ning, Hubei (CN); Wu Ouyang, Hubei (CN); Fei Hu, Hubei (CN)

(73) Assignee: WUHAN UNIVERSITY OF TECHNOLOGY, Hubei (CN)

( * ) Notice: Subject to any disclaimer, the term of this patent is extended or adjusted under 35 U.S.C. 154(b) by 0 days.

(21) Appl. No.: 18/371,582

(22) Filed: Sep. 22, 2023

(65) Prior Publication Data

US 2024/0110896 A1 Apr. 4, 2024

(30) Foreign Application Priority Data

Sep. 23, 2022 (CN) .......................... 202211166006.7

(51) Int. Cl.
| | | |
|---|---|---|
| *G01N 29/07* | (2006.01) | |
| *F16C 41/00* | (2006.01) | |
| *G01M 13/04* | (2019.01) | |

(52) U.S. Cl.
CPC ............. *G01N 29/07* (2013.01); *F16C 41/00* (2013.01); *G01M 13/04* (2013.01); *F16C 2233/00* (2013.01)

(58) Field of Classification Search
CPC ...... G01N 29/07; G01N 29/043; F16C 41/00; F16C 2233/00; G01M 13/04; G06N 3/006; G01B 17/02; Y02E 30/30
(Continued)

(56) References Cited

U.S. PATENT DOCUMENTS 6,681,634 B2 * 1/2004 Sabini .................. G01N 29/449
73/660
8,438,925 B2 * 5/2013 Klos .................... G01M 13/045
73/660
(Continued)

FOREIGN PATENT DOCUMENTS

| CN | 104197872 A | 12/2014 |
|---|---|---|
| CN | 104729436 A | 6/2015 |

(Continued)

OTHER PUBLICATIONS

Office Action issue by the State Intellectual Property Office of The Peoples Republic of China on Apr. 21, 2023 for Application No. 202211166006.7, China.

*Primary Examiner* — Jacques M Saint Surin
(74) *Attorney, Agent, or Firm* — Locke Lord LLP; Tim Tingkang Xia, Esq.

(57) ABSTRACT

A wear monitoring method of a polymer thrust bearing based on an ultrasonic reflection coefficient amplitude spectrum (URCAS), includes: selecting a corresponding delay block probe based on a material of a to-be-tested bearing, and setting corresponding parameters of a pulse generator; after collecting a primary echo from a surface of the delay block probe as a reference signal, placing the delay block probe in a designated region on a back of the to-be-tested bearing, and collecting time-domain echo signals from upper and lower surfaces of the bearing; establishing a propagation model of an ultrasonic signal in a polymer bearing, and calculating a theoretical URCAS based on the propagation model; calculating a measured URCAS; and constructing an objective function, and solving the objective function by using a differential evolution algorithm. A
(Continued)

plurality of parameters of the polymer bearing is solved to meet a requirement for wear monitoring by adopting the method.

7 Claims, 9 Drawing Sheets

(58) Field of Classification Search
USPC .......................................................... 73/597
See application file for complete search history.

(56) References Cited

U.S. PATENT DOCUMENTS

| | | | |
|---|---|---|---|
| 9,989,439 B2* | 6/2018 | Thomson | G01M 13/045 |
| 10,337,958 B2* | 7/2019 | Sakaguchi | F16C 19/00 |
| 11,796,420 B2* | 10/2023 | Wei | G06Q 10/20 |
| 2015/0053005 A1 | 2/2015 | Smith et al. | |
| 2016/0187226 A1* | 6/2016 | Tsutsui | G01M 13/045 |
| | | | 73/593 |
| 2023/0273158 A1* | 8/2023 | Wu | G01N 29/07 |
| | | | 702/34 |

FOREIGN PATENT DOCUMENTS

| | | |
|---|---|---|
| CN | 105651215 A | 6/2016 |
| CN | 113063593 A | 7/2021 |

* cited by examiner

WEAR MONITORING METHOD OF POLYMER THRUST BEARING BASED ON ULTRASONIC REFLECTION COEFFICIENT AMPLITUDE SPECTRUM (URCAS)

CROSS-REFERENCE TO RELATED APPLICATION

This application claims priority to Chinese Patent Application No. 202211166006.7, filed Sep. 23, 2022, which is hereby incorporated herein in its entirety by reference.

TECHNICAL FIELD

The present disclosure relates to the technical field of wear detection of bearing, and in particular, to a wear monitoring method of a polymer thrust bearing based on an ultrasonic reflection coefficient amplitude spectrum (URCAS).

BACKGROUND

As an advanced thrusting technology for electric direct drive ships (warships), the rim-driven thruster (RDT) has received much attention in recent years. The RDT creatively integrates a driving motor, a propeller, a bearing, a duct, a rudder, and other components. The propeller is installed in a motor rotor ring, and a stator coil is installed in the duct. When powered on, the stator drives the rotor embedded with a permanent magnet to rotate, so that the propeller is driven to generate thrust. The thrust is carried by bearings at both ends to provide power for the ships (warships). This direct drive mode has significant advantages such as a high power density, high efficiency, small cabin space, and low vibration noise. At present, many research institutions and companies at home and abroad are engaged in the development of this thruster. However, there is a lack of effective methods and technologies for health management. As a key functional support component of the RDT, a water-lubricated thrust bearing is used to bear the thrust generated by the propeller, and it is also one of bottlenecks limiting power increase of the RDT. The water-lubricated thrust bearing has the following characteristics: 1) the water-lubricated thrust bearing is usually made of a polymer composite material (such as rubber, thordon, or phylon); 2) the water-lubricated thrust bearings usually work under harsh working conditions. On one hand, the load is very large, and the specific pressure of the water-lubricated thrust bearing of a megawatt RDT exceeds 0.6 MPa, while the specific pressure of a water-lubricated stern bearing generally does not exceed 0.3 MPa. On the other hand, the low rotation speed is relatively low, ranging from 10 r·min$^{-1}$ to 300 r·min$^{-1}$, and the water-lubricated thrust bearing is also affected by impurities such as sediments in water. A low viscosity of the water results in a thin water film and a small bearing capacity. The water-lubricated thrust bearing of the RDT is in a mixed lubrication state under the influence of the low velocity, the heavy load, impact, the sediment, and other factors, and is prone to local contact friction and wear. As a result, abnormal noise and vibrations are generated, and the reliability of the entire thruster is hence reduced. Therefore, it is necessary to conduct research and engineering application for status monitoring of the water-lubricated thrust bearing.

A common failure mode of the water-lubricated thrust bearing of the RDT is wear-out failure, and a wear magnitude can directly reflect a health status of the bearing. Usually, wear measurement methods can be classified into non-in-situ and in-situ measurement. The non-in-situ measurement usually includes methods for weighing, wear scar measurement, direct measurement, chemical analysis, and the like. These methods require disassembling of a bearing assembly structure, and it is difficult to fully recover the status and working condition of the bearing after reassembly. Moreover, such discrete measurement cannot detect a failure of the bearing due to an abnormal wear magnitude in real-time. Therefore, it is necessary to develop an in-situ wear magnitude monitoring method for a water-lubricated bearing. The core of linear wear magnitude measurement is to obtain a thickness change of a measured point, in other words, to measure a distance parameter. At present, scholars have developed various in-situ distance monitoring methods based on principles of sound, light, and electricity. The electrical method, such as an inductance method and a resistance method, has high recognition accuracy. However, the electrical method requires the measurement object to be conductive. The water-lubricated bearing is usually made of the polymer composite material, which cannot meet the requirement of the electrical method. The optical method has high accuracy in distance recognition, but it requires the material to be of good transparency. Therefore, the optical method is often used in laboratory scenarios and is difficult to be applied in an actual bearing. The ultrasonic method has high sensitivity and good penetration, and is more suitable for in-situ wear monitoring of the water-lubricated thrust bearing. However, the traditional ultrasonic thickness monitoring method has the following problems that need to be overcome: the time-domain method relies on accurate prior knowledge of a sound velocity and a time-domain waveform with a high signal-to-noise ratio. However, the polymer bearing is added with other components to enhance the performance during the production process, and hence the polymer bearing has the features of a large sound attenuation, a low echo signal-to-noise ratio, an uneven temperature distribution during operation, and a difficulty in determining a propagation speed of a sound wave. In addition, there is a thermoelastic deformation in the bearing, and both geometric and physical parameters are variable. Therefore, it is necessary to develop a method that can simultaneously solve a plurality of parameters of the polymer bearing to meet the requirement of wear monitoring.

SUMMARY OF PRESENT INVENTION

An object of the present disclosure is to provide a wear monitoring method of a polymer thrust bearing based on a URCAS, so as to simultaneously solve a plurality of parameters of a polymer bearing to meet the requirement for wear monitoring.

In order to achieve the above objective, the present disclosure provides a wear monitoring method of a polymer thrust bearing based on a URCAS, including following steps:

Selecting a corresponding delay block probe based on a material of a to-be-tested bearing, setting corresponding parameters of a pulse generator, connecting the delay block probe to the pulse generator, and connecting the pulse generator to a digital oscilloscope;

After collecting a primary echo from a surface of the delay block probe as a reference signal, placing the delay block probe in a designated region on a back of the to-be-tested bearing, and collecting time-domain echo signals from upper and lower surfaces of the bearing;

Establishing a propagation model of an ultrasonic signal in a polymer bearing, and calculating a theoretical URCAS based on the propagation model;

Calculating a measured URCAS based on the time-domain echo signals collected from the upper and lower surfaces of the bearing; and Constructing an objective function based on the measured URCAS and the theoretical URCAS to represent a similarity between measured echo data and theoretical calculated echo data, and solving the objective function by using a differential evolution algorithm. When a correlation coefficient is the largest and a root-mean-square error is the smallest, a similarity between the measured URCAS and the theoretical URCAS is the largest, and in this case, independent variables corresponding to the objective function are parameters of the polymer bearing.

Preferably, the setting corresponding parameters of the pulse generator include: setting a pulse repetition frequency (PRF), pulse energy, a damping, a gain, and a filter bandwidth.

Preferably, when the propagation model of the ultrasonic signal in the polymer bearing is established, the bearing is simplified into a homogeneous and smooth layered material. A medium I is a delay block, a medium II is a layered polymer material, and a medium III is air or water. Acoustic impedance of the medium I, the medium II, and the medium III is Z1, Z2, and Z3 respectively. The acoustic impedance is numerically equal to a density of the medium multiplied by a sound velocity. When an ultrasonic pulse wave with a sound pressure of 1 and a frequency of f is perpendicularly incident into a three-layer medium along a negative direction of a z axis, a received reflected wave is expressed as follows:

$$\begin{cases} P_1 = r_{12} \\ P_2 = r_{23}t_{12}t_{21} \exp(2ik_{2z}d) \\ P_3 = r_{23}^2 t_{12}r_{21}t_{21} \exp(4ik_{2z}d) \\ \cdots \\ P_n = r_{23}^n t_{12}r_{21}^{n-1}t_{21} \exp[2(n-1)ik_{2z}d], k_{2z} = \frac{2\pi f}{c_2} + i\alpha \end{cases}$$

where $P_1$ represents a reflected echo of an upper interface of a polymer layer, $P_2$ represents a sound wave transmitted into the polymer layer and transmitted from the upper interface after being reflected once on a lower interface, $P_3$ represents a sound wave transmitted into the polymer layer and transmitted from the upper interface after being reflected twice on the lower interface, and $P_n$ represents a sound wave transmitted into the polymer layer and transmitted from the upper interface after being reflected n times on the lower interface; $r_{12}$ and $r_{23}$ respectively represent reflection coefficients of the polymer layer when an ultrasonic wave is propagated to interfaces 1 and 2 along the negative direction of the z axis, and $r_{21}$ represents a reflection coefficient of the polymer layer when the ultrasonic wave is propagated to the interface 1 along a positive direction of the z axis; $t_{12}$ and $t_{21}$ respectively represent coefficients of transmitting the sound pressure along different directions on the interface 1; n represents a quantity of reflection echoes; d and $c_2$ respectively represent a thickness and a sound velocity of the polymer layer; α represents an attenuation coefficient of the polymer layer; $k_{2z}$ represents a quantity of waves along a z direction in the polymer layer; $\exp(2ik_{2z}d)$ represents a phase change of the sound wave after one round trip in the polymer layer; $\exp(4ik_{2z}d)$ represents a phase change of the sound wave after two round trips in the polymer layer; and $\exp(2(n-1)k_{2z}d)$ represents a phase change of the sound wave after (n−1) round trips in the polymer layer.

Preferably, during calculation of the theoretical URCAS, a reflection coefficient R of the polymer layer is expressed as follows:

$$R = \frac{P_1 + P_2}{P_1} =$$

$$\frac{r_{12} + t_{12}r_{23}t_{21}\exp(-2\alpha d)\cos\left(\frac{4\pi fd}{c_2}\right)}{r_{12}} + i\frac{t_{12}r_{23}t_{21}\exp(-2\alpha d)\sin\left(\frac{4\pi fd}{c_2}\right)}{r_{12}}.$$

The reflection coefficient R of the polymer layer is a complex number. A mode of the reflection coefficient is a function of a frequency, and the function is referred to as the URCAS, which is expressed as follows:

$$R(f) = \sqrt{\left\{\left[r_{12}^2 + 2r_{12}r_{23}(1 - r_{12}^2)\exp(-2\alpha d)\cos\left(\frac{4\pi fd}{c_2}\right) + r_{23}^2(1 - r_{12}^2)^2 \exp(-4\alpha d)\right]/r_{12}^2\right\}}$$

An attenuation coefficient of the polymer layer is expressed as follows:

$$\alpha(f) = \frac{1}{2d}\ln\left[\frac{(1 - r_{12}^2)r_{23}A_1(f)}{r_{12}A_2(f)}\right] = \frac{1}{2d}\ln\left[w \cdot \frac{A_1(f)}{A_2(f)}\right]$$

where $A_1(f)$ and $A_2(f)$ respectively represent amplitude spectra of reflection echoes on the upper and lower interfaces of the polymer layer, and w represents an attenuation factor.

Preferably, when the measured URCAS is calculated, zero filling and fast fourier transform (FFT) are performed on the reference signal collected from the delay block probe to obtain a frequency-domain amplitude spectrum. A bandwidth at −6 dB of the frequency-domain amplitude spectrum is intercepted as an effective frequency band. Time-domain separation, the zero filling, and the FFT are sequentially performed on reflected waves collected from the upper and lower surfaces of the polymer bearing to obtain an amplitude spectrum $A_{12}(f)$ of the upper and lower interfaces, the amplitude spectrum $A_1(f)$ of the upper interface, and the amplitude spectrum $A_2(f)$ of the lower interface. The measured URCAS $\overline{R(f)}$ is calculated according to the following formula:

$$\overline{R(f)} = \frac{A_{12}(f)}{A_1(f)}.$$

Preferably, when the objective function is constructed to represent the similarity between the measured echo data and the theoretical calculated echo data, the correlation coefficient and the root-mean-square error are selected as the objective function to measure the similarity between the theoretical URCAS and the measured URCAS. The correlation coefficient reflects a similarity between change trends of the measured and the theoretical calculated echo data, and a formula of the URCAS is substituted to obtain an expression of the correlation coefficient:

$$r_p(c_2, d, \rho, w) = \frac{\sum_{i=1}^{N}\left[R(f; c_2, d, \rho, w) - \overline{R(f; c_2, d, \rho, w)}\right]}{\sqrt{\sum_{i=1}^{N}\left[R(f; c_2, d, \rho, w) - \overline{R(f; c_2, d, \rho, w)}\right]^2}\sqrt{\sum_{i=1}^{N}\left[R(f; c_2, d, \rho, w)^* - \overline{R(f; c_2, d, \rho, w^*)}\right]^2}}$$

where N represents a quantity of data points within a frequency domain range after the FFT is performed on a time-domain signal; the subscript i represents an $i^{th}$ frequency value; $R(f;c_2,d,p,w)$ and $R(f;c_2,d,p,w)^*$ respectively represent a measured URCAS and a theoretical URCAS within an effective frequency band; and $\overline{R(f;c_2,d,p,w)}$ itch $\overline{R(f;c_2,d,p,w)}^*$ respectively represent arithmetic mean values of the measured URCAS and the theoretical URCAS within the effective frequency band.

The root-mean-square error is introduced as a second constraint, which reflects numerical consistency of the measured and the theoretical calculated echo data, and an expression of the root-mean-square error is obtained by substituting the measured URCAS $R(f;c_2,d,p,w)$ and the theoretical URCAS $R(f;c_2,d,p,w)^*$:

$$RMSE = \sqrt{\frac{1}{N}\sum_{i=1}^{N}[R(f; c_2, d, \rho, w) - R(f; c_2, d, \rho, w)^*]^2}.$$

When the correlation coefficient is the largest and the root-mean-square error is the smallest, the similarity between the measured URCAS and the theoretical URCAS is the largest. In this case, the independent variables corresponding to the objective function are the parameters of the polymer bearing.

Preferably, the solving the the objective function by using the differential evolution algorithm comprises the following steps:

Initialization: randomly initializing a population in solution space of a to-be-solved parameter;
Differential mutation: under a Rand mutation strategy, performing differential scaling on a randomly generated sub-individual to produce a mutation vector;
Crossover: performing a crossover operation by using a binomial step-by-step crossover operator, to generate a test vector;
Selection: comparing fitness of a test individual and a parent individual by using a greedy selection strategy, and preserving an individual with best fitness in a new-generation population; and
Determining: determining an evolution termination condition, and reaching a maximum quantity of evolution generations or obtaining an optimal solution.

Preferably, when the objective function is solved by using the differential evolution algorithm, For the constructed objective function, the differential evolution algorithm randomly generates a population $\{X_{1,g}, X_{2,g}, \ldots, X_{Np,g}\}$ containing NP feasible solutions, where g represents a quantity of evolution generations, NP represents a quantity of feasible solutions, and X represents a representation symbol of the individual in the population; an individual $X_{j,g}=(x_{1,g}^j, x_{2,g}^j, \ldots, x_{D,g}^j)$ in the population is used to represent a solution of a problem, where D represents a quantity of dimensions of an optimization variable, and g represents the quantity of evolution generations; and each individual is uniformly and randomly determined within a range of $[X_{min}, X_{max}]$, wherein $X_{min}=(x_{min}^1, x_{min}^2, \ldots, x_{min}^D)$, $X_{max}=(x_{max}^1, x_{max}^2, \ldots, x_{max}^D)$ and a series of random individuals constitute an initial population, which is expressed as the following formula:

$$x_j^i = x_{min}^j + rand(0,1) \cdot (x_{max}^j - x_{min}^j), j \in [1,D]$$

where rand(0,1) represents a real number that is uniformly and randomly determined between 0 and 1;

The differential evolution algorithm realizes individual mutation based on a differential strategy, randomly selects two different individuals in the population based on a classic mutation strategy, and then scales a vector difference of the two different individuals to perform vector synthesis with the to-be-mutated individuals, where the generated mutation vector $V_{i,g}$ is expressed as the following formula:

$$V_{i,g} = X_{a,g} + F \cdot (X_{b,g} - X_{c,g}), a \neq b \neq c \neq i$$

where $X_{a,g}$, $X_{b,g}$, and $X_{c,g}$ represent three randomly selected individuals in the population, and F represents a scaling factor;

The differential evolution algorithm introduces the crossover operation, such that at least one component of the test vector comes from the mutation vector, as shown in the following formula:

$$U_{i,g+1} = \begin{cases} V_{i,g}^j, & \text{if } (rand^j(0, 1) \leq CR) \text{ or } (j = j_{rand}) \\ X_{i,g}^j, & \text{otherwise} \end{cases}$$

where $rand^j(0,1)$ represents a uniform random number between 0 and 1 in a $j^{th}$ calculation, CR represents a crossover probability within a range of [0,1], the index $j_{rand}$ represents a randomly selected quantity of dimensions to ensure that the test vector $U_{i,g+1}$ obtains at least one element from $U_{i,g}$, and the crossover operation is referred to as binomial uniform crossover;

The differential evolution algorithm selects the greedy selection strategy, and compares an individual generated through the mutation and crossover operations and a parent individual of the generated individual, where an individual performing well enters the next-generation population, which is expressed as the following formula:

$$X_{i,g+1} = \begin{cases} U_{i,g+1}, & \text{if } f(U_{i,g+1}) < f(X_{i,g}) \\ X_{i,g}, & \text{otherwise} \end{cases}, i = 1, 2, \ldots, NP$$

After a series of mutation, crossover, and selection operations, new individuals whose quantity is the same as a quantity of individuals forming the next-generation population are generated, a previous-generation population continues to cycle until the termination condition is met, and an optimal result is an obtained thickness parameter of the bearing.

The wear monitoring method of a polymer thrust bearing based on a URCAS in the present disclosure has following beneficial effects:

1. At present, non-in-situ monitoring is traditionally performed to monitor wear of a bearing. In the non-in-situ monitoring, the bearing needs to be disassembled, and an electronic scale or a measuring tool is used to measure a mass wear magnitude or thickness wear magnitude. The process is cumbersome and a measured value is discrete. The present disclosure adopts an ultrasonic method to measure a wear thickness of a polymer bearing. Firstly, the ultrasonic method avoids requirements of electrical and optical methods for conductivity and transparency of the polymer bearing. Secondly, the ultrasonic method has a potential to achieve the in-situ wear monitoring on a back of the bearing, and a thickness of the bearing can be measured without a need to disassemble the bearing. This monitoring method has advantages of less dependence on prior knowledge, a wide calculation range, high inversion accuracy, and the like.

2. The ultrasonic time-domain method relies on accurate prior knowledge of a sound velocity and a time-domain waveform with a high signal-to-noise ratio. However, the polymer bearing is added with other components to enhance the performance during the production process, and hence the polymer bearing has the features of a large sound attenuation, a low echo signal-to-noise ratio, an uneven temperature distribution during operation, and a difficulty in determining a propagation speed of a sound wave. In addition, there is a thermoelastic deformation in the bearing, and both geometric and physical parameters are variable. Therefore, the present disclosure uses a URCAS to convert a calculation process to a frequency domain, and combines a differential evolution algorithm to overcome limitations of a direct solving method, such as long operation time and a small calculation range. In addition, the present disclosure can simultaneously invert the sound velocity, the thickness, the density, and the attenuation factor, without the accurate prior knowledge, and is environmentally friendly.

3. Different from a calibration result of a high precision spiral micrometer, a calculation result obtained by the monitoring method has an absolute error of less than 100 μm and a relative error of less than 1%, which meets an engineering inspection requirement. Therefore, the monitoring method has high promotion value.

DESCRIPTION OF THE DRAWINGS

FIG. 5b is an enlarged view of A shown in FIG. 5a;

Figure 1:
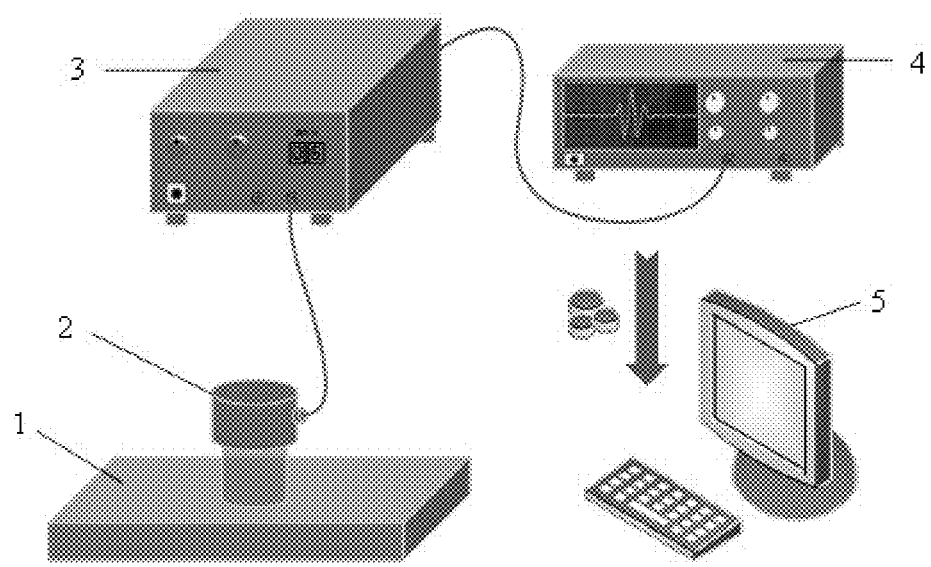
FIG. 1 is a schematic diagram showing a device structure for a wear monitoring method of a polymer thrust bearing based on a URCAS according to the present disclosure.

In the drawings, 1: polymer bearing material; 2: delay block probe; 3: pulse generator; 4: digital oscilloscope; 5: computer with a Python program; 6: rotating spindle; 7: thrust disc; 8: lubricating medium; 9: polyetherether ketone (PEEK) thrust pad; and 10: support ring.

The implementation of the objectives, the functional characteristics, and the advantages of the present disclosure will be further described below with reference to the embodiments and the drawings.

DETAILED DESCRIPTION OF THE EMBODIMENTS

It should be understood that the specific embodiments described herein are merely intended to explain the present disclosure, but not to limit the present disclosure.

Figure 8:
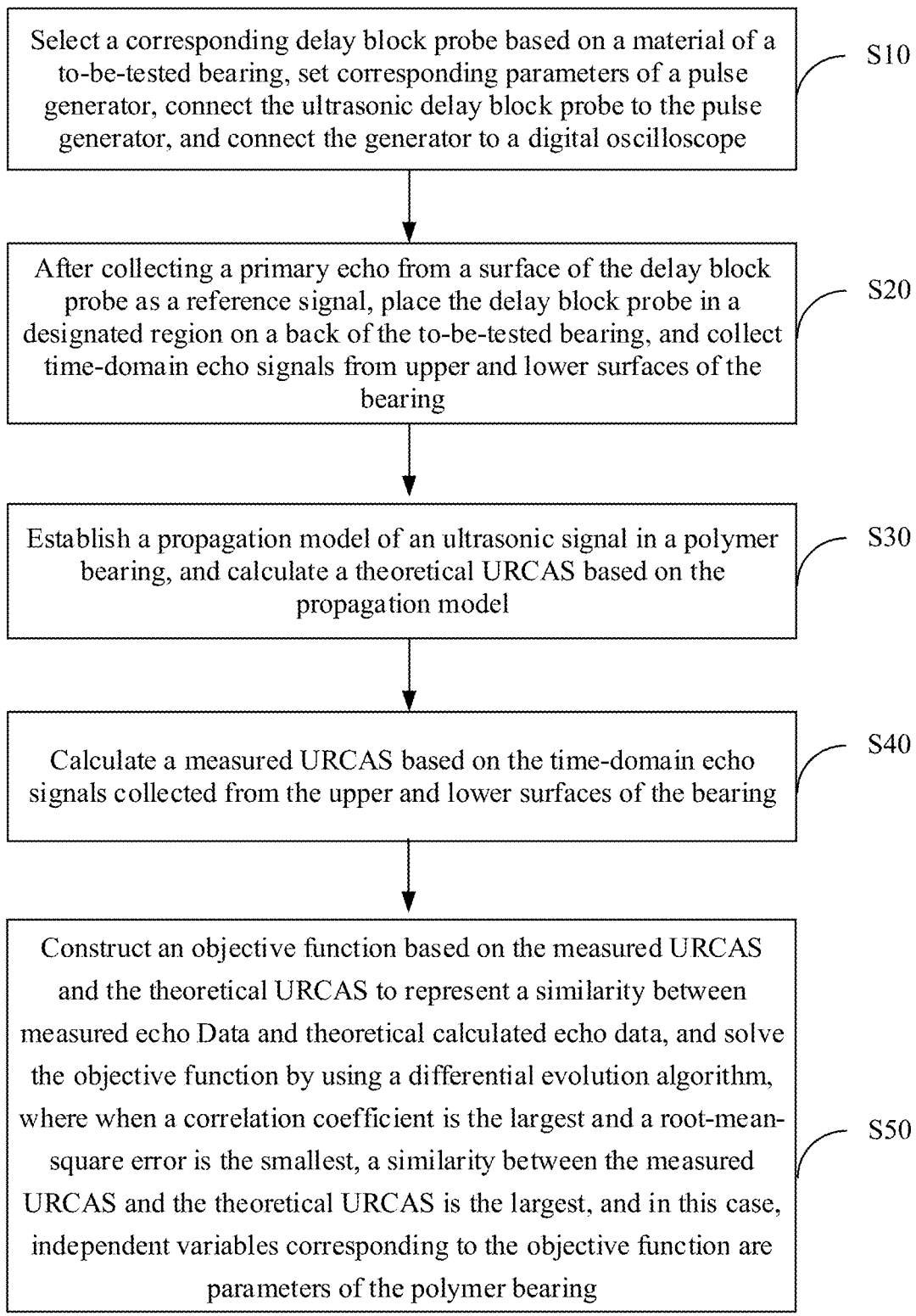
FIG. 8 is a schematic flowchart showing a wear monitoring method of a polymer thrust bearing based on a URCAS according to the present disclosure.

Referring to FIG. 8, a wear monitoring method of a polymer thrust bearing based on a URCAS includes following steps according to a preferred embodiment.

In step S10, a corresponding delay block probe is selected based on a material of a to-be-tested bearing, corresponding parameters of a pulse generator 3 are set, the delay block probe is connected to the pulse generator 3, and the pulse generator 3 is connected to a digital oscilloscope 4.

In step S20, after collecting a primary echo from a surface of the delay block probe as a reference signal, the delay block probe is placed in a designated region on a back of the to-be-tested bearing, and time-domain echo signals are collected from upper and lower surfaces of the bearing.

In step S30, a propagation model of an ultrasonic signal in a polymer bearing is established, and a theoretical URCAS is calculated based on the propagation model.

In step S40, a measured URCAS is calculated based on the time-domain echo signals collected from the upper and lower surfaces of the bearing.

In step S50, an objective function is constructed based on the measured URCAS and the theoretical URCAS to represent a similarity between measured echo data and theoretical calculated echo data. The objective function is solved by using a differential evolution algorithm. When a correlation coefficient is the largest and a root-mean-square error is the smallest, a similarity between a measured URCAS and a theoretical URCAS is the largest. In this case, independent variables corresponding to the objective function are parameters of the polymer bearing (a sound velocity, a density, a thickness, and an attenuation factor of the bearing are simultaneously solved).

In the step S10, the corresponding parameters of the pulse generator 3 include a PRF, pulse energy, a damping, a gain, and a filter bandwidth.

In the step S30, when the propagation model of the ultrasonic signal in the polymer bearing is established, the bearing is simplified into a homogeneous and smooth layered material. A medium I is a delay block, a medium II is a layered polymer material, a medium III is air or water. Acoustic impedance of the medium I, the medium II, and the medium III is Z1, Z2, and Z3 respectively. The acoustic impedance is numerically equal to a density of the medium multiplied by a sound velocity. When an ultrasonic pulse wave with a sound pressure of 1 and a frequency of f is perpendicularly incident into a three-layer medium along a negative direction of a z axis, a received reflected wave is expressed as follows:

$$\begin{cases} P_1 = r_{12} \\ P_2 = r_{23} t_{12} t_{21} \exp(2ik_{2z}d) \\ P_3 = r_{23}^2 t_{12} r_{21} t_{21} \exp(4ik_{2z}d) \\ \cdots\cdots \\ P_n = r_{23}^n t_{12} r_{21}^{n-1} t_{21} \exp[2(n-1)ik_{2z}d], k_{2z} = \dfrac{2\pi f}{c_2} + i\alpha \end{cases}$$

In the above formula, $P_1$ represents a reflected echo of an upper interface of a polymer layer, $P_2$ represents a sound wave transmitted into the polymer layer and transmitted from the upper interface after being reflected once on a lower interface, $P_3$ represents a sound wave transmitted into the polymer layer and transmitted from the upper interface after being reflected twice on the lower interface, and $P_n$ represents a sound wave transmitted into the polymer layer and transmitted from the upper interface after being reflected n times on the lower interface. $r_{12}$ and $r_{23}$ respectively represent reflection coefficients of the polymer layer when an ultrasonic wave is propagated to interfaces 1 and 2 along the negative direction of the z axis, and $r_{21}$ represents a reflection coefficient of the polymer layer when the ultrasonic wave is propagated to the interface 1 along a positive direction of the z axis. $t_{12}$ and $t_{21}$ respectively represent coefficients of transmitting the sound pressure along different directions on the interface 1. n represents a quantity of reflection echoes. d and $c_2$ respectively represent a thickness and a sound velocity of the polymer layer. $\alpha$ represents an attenuation coefficient of the polymer layer. $k_{2z}$ represents a quantity of waves along a z direction in the polymer layer. $\exp(2ik_{2z}d)$ represents a phase change of the sound wave after one round trip in the polymer layer. $\exp(4ik_{2z}d)$ represents a phase change of the sound wave after two round trips in the polymer layer. $\exp(2(n-1)k_{2z}d)$ represents a phase change of the sound wave after (n-1) round trips in the polymer layer.

In the step S30, when the theoretical URCAS is calculated, a reflection coefficient R of the polymer layer is expressed as follows:

$$R = \frac{P_1 + P_2}{P_1} =$$

$$\frac{r_{12} + t_{12}r_{23}t_{21}\exp(-2\alpha d)\cos\left(\frac{4\pi fd}{c_2}\right)}{r_{12}} + i\frac{t_{12}r_{23}t_{21}\exp(-2\alpha d)\sin\left(\frac{4\pi fd}{c_2}\right)}{r_{12}}.$$

The reflection coefficient R of the polymer layer is a complex number. A mode of the reflection coefficient is a function of a frequency, and the function is referred to as the URCAS, which is expressed as follows:

$$R(f) = \sqrt{\left[r_{12}^2 + 2r_{12}r_{23}(1-r_{12}^2)\exp(-2\alpha d)\cos\left(\frac{4\pi fd}{c_2}\right) + r_{23}^2(1-r_{12}^2)^2\exp(-4\alpha d)\right]/r_{12}^2}$$

The attenuation coefficient of the polymer layer is expressed as follows:

$$\alpha(f) = \frac{1}{2d}\ln\left[\frac{(1-r_{12}^2)r_{23}A_1(f)}{r_{12}A_2(f)}\right] = \frac{1}{2d}\ln\left[w \cdot \frac{A_1(f)}{A_2(f)}\right].$$

In the above expression, $A_1(f)$ and $A_2(f)$ respectively represent amplitude spectra of reflection echoes on the upper and lower interfaces of the polymer layer, and w represents the attenuation factor.

In the step S40, when the measured URCAS is calculated, zero filling and FFT are performed on the reference signal collected from the delay block probe to obtain a frequency-domain amplitude spectrum. A bandwidth at −6 dB of the frequency-domain amplitude spectrum is intercepted as an effective frequency band. Time-domain separation, the zero filling, and the FFT are sequentially performed on reflected waves collected from the upper and lower surfaces of the polymer bearing to obtain an amplitude spectrum $A_{12}(f)$ of the upper and lower interfaces, the amplitude spectrum $A_1(f)$ of the upper interface, and the amplitude spectrum $A_2(f)$ of the lower interface. The measured URCAS $\overline{R(f)}$ is calculated according to a following formula:

$$\overline{R(f)} = \frac{A_{12}(f)}{A_1(f)}.$$

In the step S40, when the objective function is constructed to represent the similarity between the measured echo data and the theoretical calculated echo data, the correlation coefficient and the root-mean-square error are selected as the objective function to measure the similarity between the theoretical URCAS and the measured URCAS. The correlation coefficient reflects a similarity between change trends of the measured and the theoretical calculated echo data, and a formula of the URCAS is substituted to obtain an expression of the correlation coefficient:

$$r_p(c_2, d, \rho, w) = \frac{\sum_{i=1}^{N}\left[R(f;c_2,d,\rho,w) - \overline{R(f;c_2,d,\rho,w)}\right]\left[R(f;c_2,d,\rho,w)^* - \overline{R(f;c_2,d,\rho,w)^*}\right]}{\sqrt{\sum_{i=1}^{N}\left[R(f;c_2,d,\rho,w) - \overline{R(f;c_2,d,\rho,w)}\right]^2}\sqrt{\sum_{i=1}^{N}\left[R(f;c_2,d,\rho,w)^* - \overline{R(f;c_2,d,\rho,w)^*}\right]^2}}$$

In the above expression, N represents a quantity of data points within a frequency domain range after the FFT is performed on a time-domain signal. The subscript i represents an $i^{th}$ frequency value. $R(f;c_2,d,p,w)$ and $R(f;c_2,d,p,w)^*$ respectively represent the measured URCAS and the theoretical URCAS within the effective frequency band. $\overline{R(f;c_2,d,p,w)}$ and $\overline{R(f;c_2,d,p,w)^*}$ respectively represent arithmetic mean values of the measured URCAS and the theoretical URCAS within the effective frequency band.

The root-mean-square error is introduced as a second constraint, which reflects numerical consistency of the measured and the theoretical calculated echo data. An expression of the root-mean-square error can be obtained by substituting the measured URCAS $R(f;c_2,d,p,w)$ and theoretical URCAS $R(f;c_2,d,p,w)^*$:

$$\text{RMS } E = \sqrt{\frac{1}{N}\sum_{i=1}^{N}[R(f;c_2,d,\rho,w) - R(f;c_2,d,\rho,w)^*]^2}.$$

When the correlation coefficient is the largest and the root-mean-square error is the smallest, the similarity between the measured URCAS and the theoretical URCAS is the largest. In this case, the independent variables corresponding to the objective function are the parameters of the polymer bearing.

In the step S50, when the objective function is solved by using the differential evolution algorithm, the following steps are executed:

Initialization: randomly initializing a population in solution space of a to-be-solved parameter;

Differential mutation: under a Rand mutation strategy, performing differential scaling on a randomly generated sub-individual to produce a mutation vector;

Crossover: performing a crossover operation by using a binomial step-by-step crossover operator, to generate a test vector;

Selection: comparing fitness of a test individual and a parent individual by using a greedy selection strategy, and preserving an individual with best fitness in a new-generation population; and Determining: determining an evolution termination condition, and reaching a maximum quantity of evolution generations or obtaining an optimal solution.

When the objective function is solved by using the differential evolution algorithm, a specific process is as follows:

For the constructed objective function, the differential evolution algorithm randomly generates a population $\{X_{1,g}, X_{2,g}, \ldots, X_{Np,g}\}$ containing NP feasible solutions, where g represents a quantity of evolution generations, NP represents a quantity of feasible solutions, and X represents a representation symbol of the individual in the population; an individual $X_{j,g}=(x_{1,g}^j, x_{2,g}^j, \ldots, x_{D,g}^j)$ in the population is used to represent a solution of a problem, where D represents a quantity of dimensions of an optimization variable, and g represents the quantity of evolution generations; and each individual is uniformly and randomly determined within a range of $[X_{min}, X_{max}]$, where $X_{min}=(x_{min}^1, x_{min}^2, \ldots, x_{min}^D)$, $X_{max}=(x_{max}^1, x_{max}^2, \ldots, x_{max}^D)$, and a series of random individuals constitute an initial population, which is represented as a following formula:

$$x_i^j = x_{min}^j + rand(0,1) \cdot (x_{max}^j - x_{min}^j), j \in [1, D]$$

In the above formula, rand(0,1) represents a real number that is uniformly and randomly determined between 0 and 1.

The differential evolution algorithm realizes individual mutation based on a differential strategy, randomly selects two different individuals in the population based on a classic mutation strategy, and then scales a vector difference of the two different individuals to perform vector synthesis with the to-be-mutated individuals, where the generated mutation vector $V_{i,g}$ is expressed as a following formula:

$$V_{i,g} = X_{a,g} + F \cdot (X_{b,g} - X_{c,g}), a \neq b \neq c \neq i$$

In the above formula, $X_{a,g}$, $X_{b,g}$, and $X_{c,g}$ represent three randomly selected individuals in the population, and F represents a scaling factor.

The differential evolution algorithm introduces the crossover operation, such that at least one component of the test vector comes from the mutation vector, as shown in a following formula:

$$U_{i,g+1} = \begin{cases} V_{i,g}^j, & \text{if } (rand^j(0,1) \leq CR) \text{ or } (j = j_{rand}) \\ X_{i,g}^j, & \text{otherwise} \end{cases}$$

In the above formula, $rand^j(0,1)$ represents a uniform random number between 0 and 1 in a $j^{th}$ calculation, CR represents a crossover probability within a range of [0,1], the index $j_{rand}$ represents a randomly selected quantity of dimensions to ensure that the test vector $U_{i,g+1}$ obtains at least one element from $U_{i,g}$, and the crossover operation is referred to as binomial uniform crossover.

The differential evolution algorithm selects the greedy selection strategy, and compares an individual generated through the mutation and crossover operations and a parent individual of the generated individual, where an individual performing well enters the next-generation population, which is expressed as a following formula:

$$X_{i,g+1} = \begin{cases} U_{i,g+1}, & \text{if } f(U_{i,g+1}) < f(X_{i,g}) \\ X_{i,g}, & \text{otherwise} \end{cases}, i = 1, 2, \ldots, NP.$$

After a series of mutation, crossover, and selection operations, new individuals whose quantity is the same as a quantity of individuals forming the next-generation population are generated, a previous-generation population continues to cycle until the termination condition is met, and an optimal result is an obtained thickness parameter of the bearing.

The following takes a specific embodiment to describe a design process of the wear monitoring method for the polymer thrust bearing and verify correctness of the monitoring method.

A thickness wear test system used in the wear monitoring method for the polymer thrust bearing is shown in FIG. 1. The thickness wear test system comprises a delay block probe, a pulse generator 3, a digital oscilloscope 4, and a computer running a Python program. A thickness wear magnitude is measured from a back of a polymer bearing. The bearing sample in the example is made of PEEK, and the monitoring method includes following steps.

(a) Treating a Surface of the Bearing

Before a wear experiment is performed on the bearing, the bearing is first immersed in water for a period of time to eliminate an impact of water swelling of the bearing on a thickness of the bearing. Then, the bearing is polished and burnished by using sandpaper, to ensure a flat and smooth surface of the bearing, with a surface roughness of about 1 μm. After that, the surface is cleaned by using anhydrous ethanol or acetone, and an appropriate coupling agent is selected to ensure good coupling between the delay block probe and the bearing.

(b) Calibrating Physical and Chemical Parameters of the Bearing

The thickness, a density, and a sound velocity of the bearing are measured. A high precision spiral micrometer is used to calibrate a thickness of the bearing at a measured point. An initial thickness is 10299 μm. An Archimedes method is used to measure a volume of the bearing, a Mettler analytical balance is used to measure mass of the bearing, and the density p of the bearing is calculated based on the volume and the mass, namely, 1270 kg·m$^{-3}$. It is understood that an elastic modulus E of a material of the bearing is 3.8 GPa, and a Poisson's ratio μ is 0.4. According to a formula (1), the sound velocity $c_2$ of the bearing is calculated, namely, 2532 m·s$^{-1}$ (the sound velocity of the bearing is consistent with that of a polymer layer):

$$c_2 = \sqrt{\frac{E(1-\mu)}{\rho(1+\mu)(1-2\mu)}} \quad (1)$$

(c) Selecting the Ultrasonic Probe

An appropriate delay block probe is selected based on the thickness, a sound attenuation characteristic, and a monitoring accuracy requirement of the polymer bearing. A delay block can better couple sound energy into a polymer material. A selection principle is as follows: For a bearing with a small thickness, a small sound attenuation, and a high monitoring accuracy requirement, a high-frequency probe is selected to improve monitoring accuracy. For a bearing with a large thickness, a severe sound attenuation, and a low monitoring accuracy requirement, a low-frequency probe is selected to avoid a too low echo signal-to-noise ratio due to a severe attenuation of an ultrasonic signal. As a sound attenuation in the polymer bearing is relatively severe, a 2.25 MHz delay block probe with a chip diameter of 13 mm produced by BIGPROBE is selected for this example. The delay block is made of polymethyl methacrylate (PMMA), and its thickness is 15 mm.

(d) Setting Parameters of a Test Instrument

For the pulse generator 3, based on a measurement demand, a PRF is set to 200 Hz, pulse energy is set to 4, a damping is set to 2 (50Ω), a gain (dB) is set to +6 dB, and a filter bandwidth is set to 1-10 MHz.

(e) Collecting the Ultrasonic Signal

After the steps (a) to (d) are performed to treat the surface of the polymer bearing, calibrate the physical and chemical parameters, select the ultrasonic probe, and set the parameters of the test instrument, a primary echo $P_0(t)$ collected from a surface of the delay block probe is selected as a reference signal, and the delay block probe is placed in a designated region on the back of the bearing. A gain, a detection mode, an average quantity of times, a sampling frequency, and other parameters of the digital oscilloscope 4 are adjusted to obtain complete time-domain echo signals $P_1(t)$ and $P_2(t)$ from upper and lower surfaces of the bearing.

(f) Constructing a Theoretical Ultrasonic Propagation Model

Figure 2:
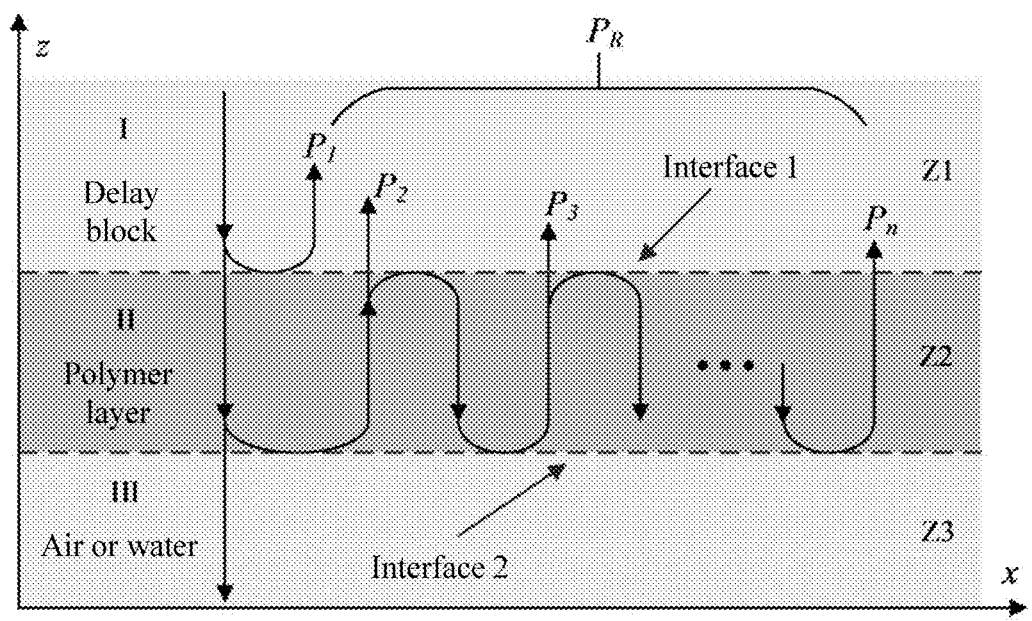
FIG. 2 is a schematic diagram showing a theoretical propagation model of an ultrasonic wave in a polymer layer.

A propagation model of the ultrasonic signal in the polymer bearing is established through Python programming in a computer. As shown in FIG. 2, the model simplifies the bearing into a homogeneous and smooth layered material, where a medium I is the delay block, which can better couple the sound energy into the polymer material; a medium II is a layered polymer material; a medium III is air or water; and acoustic impedance of the medium I, the medium II, and the medium III is Z1, Z2, and Z3 respectively, and the acoustic impedance is numerically equal to a density of the medium multiplied by a sound velocity. Assuming that an ultrasonic pulse wave whose sound pressure is 1 and frequency is f is perpendicularly incident into a three-layer medium along a negative direction of a z axis, a received reflected wave is represented as a formula (2):

$$\begin{cases} P_1 = r_{12} \\ P_2 = r_{23}t_{12}t_{21} \exp(2ik_{2z}d) \\ P_3 = r_{23}^2 t_{12}r_{21}t_{21} \exp(4ik_{2z}d) \\ \cdots \\ P_n = r_{23}^n t_{12}r_{21}^{n-1}t_{21} \exp[2(n-1)ik_{2z}d], \; k_{2z} = \frac{2\pi f}{c_2} + i\alpha \end{cases} \quad (2)$$

In the above formula, $P_1$ represents a reflected echo of an upper interface of the polymer layer, $P_2$ represents a sound wave transmitted into the polymer layer and transmitted from the upper interface after being reflected once on a lower interface, $P_3$ represents a sound wave transmitted into the polymer layer and transmitted from the upper interface after being reflected twice on the lower interface, and $P_n$ represents a sound wave transmitted into the polymer layer and transmitted from the upper interface after being reflected n times on the lower interface. $r_{12}$ and $r_{23}$ respectively represent reflection coefficients of the polymer layer when an ultrasonic wave is propagated to interfaces 1 and 2 along the negative direction of the z axis, and $r_{21}$ represents a reflection coefficient of the polymer layer when the ultrasonic wave is propagated to the interface 1 along a positive direction of the z axis. $t_{12}$ and $t_{21}$ respectively represent coefficients of transmitting the sound pressure along different directions on the interface 1. n represents a quantity of reflection echoes. d and $c_2$ respectively represent a thickness and the sound velocity of the polymer layer. α represents an attenuation coefficient of the polymer layer. $k_{2z}$ represents a quantity of waves along a z direction in the polymer layer. $\exp(2ik_{2z}d)$ represents a phase change of the sound wave after one round trip in the polymer layer. $\exp(4ik_{2z}d)$ represents a phase change of the sound wave after two round trips in the polymer layer. $\exp(2(n-1)k_{2z}d)$ represents a phase change of the sound wave after (n−1) round trips in the polymer layer.

(g) Calculating a Theoretical Reflection Coefficient Spectrum

During propagation of the ultrasonic wave, a severe signal attenuation is caused due to interface reflection and transmission losses of the polymer layer and absorption and diffusion attenuations inside the material. In reality, only primary echoes $P_1$ and $P_2$ can be received from the upper and lower interfaces of the polymer layer. Therefore, a reflection coefficient R of the polymer layer is expressed as a formula (3):

$$R = \frac{P_1 + P_2}{P_1} = \frac{r_{12} + t_{12}r_{23}t_{21} \exp(-2\alpha d) \cos\left(\frac{4\pi f d}{c_2}\right)}{r_{12}} + i\frac{t_{12}r_{23}t_{21} \exp(-2\alpha d) \sin\left(\frac{4\pi f d}{c_2}\right)}{r_{12}} \quad (3)$$

The reflection coefficient R of the polymer layer is a complex number, a mode of the reflection coefficient is a function of a frequency, and the function is referred to as the URCAS, which is expressed as a formula (4):

$$R(f) = \sqrt{\left\{\left[r_{12}^2 + 2r_{12}r_{23}(1-r_{12}^2)\exp(-2\alpha d)\cos\left(\frac{4\pi f d}{c_2}\right) + r_{23}^2(1-r_{12}^2)^2 \exp(-4\alpha d)\right]/r_{12}^2\right\}} \quad (4)$$

An attenuation coefficient of the polymer layer is expressed as a formula (5):

$$\alpha(f) = \frac{1}{2d}\ln\left[\frac{(1-r_{12}^2)r_{23}A_1(f)}{r_{12}A_2(f)}\right] = \frac{1}{2d}\ln\left[w \cdot \frac{A_1(f)}{A_2(f)}\right] \quad (5)$$

In the above formula, $A_1(f)$ and $A_2(f)$ respectively represent amplitude spectra of reflection echoes on the upper and lower interfaces of the polymer layer, and an attenuation factor w is introduced to facilitate subsequent calculation.

(h) Calculating a Measured URCAS

Figure 3:
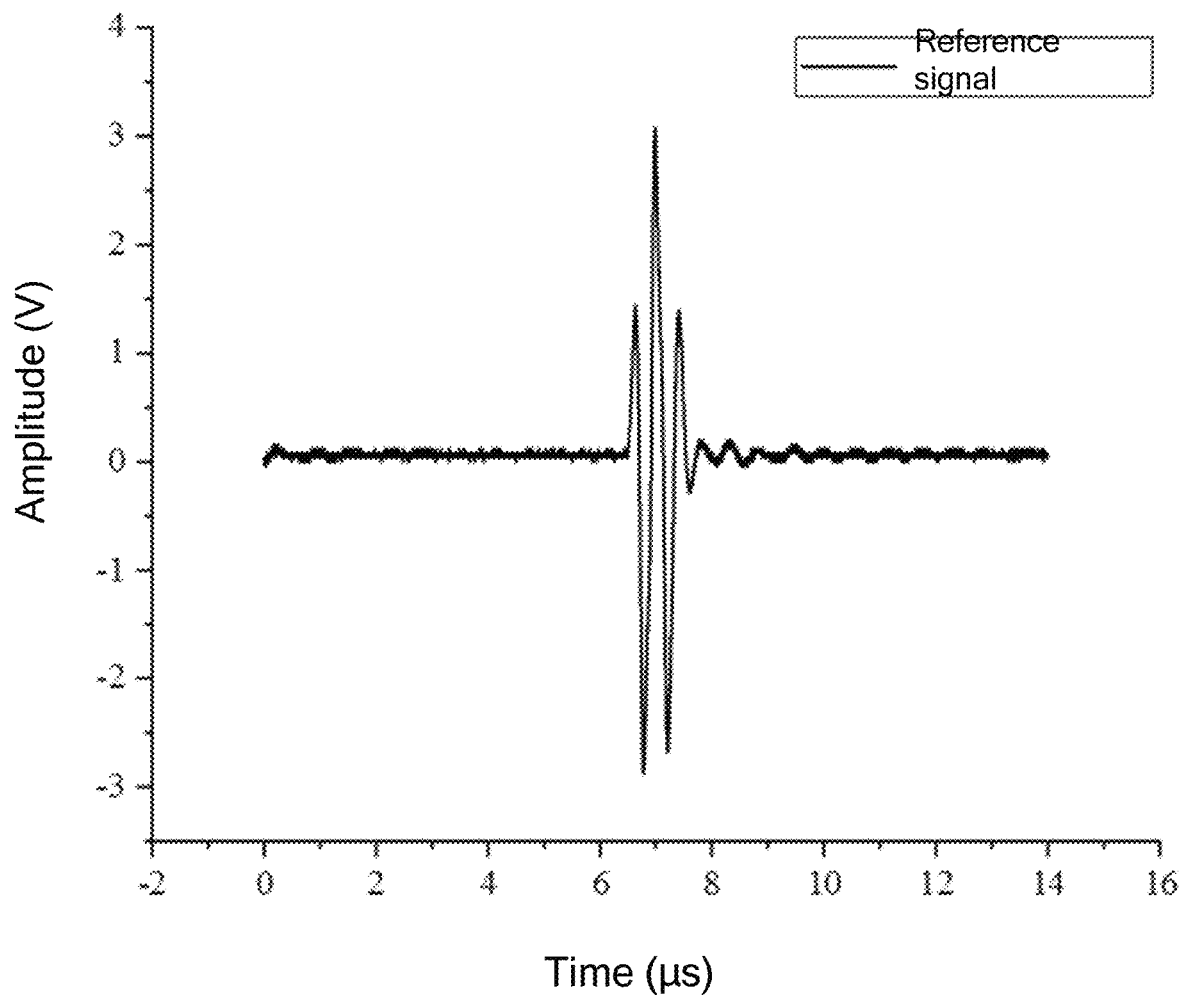
FIG. 3 is a schematic diagram showing a reference signal and an effective frequency band of an ultrasonic probe.
Figure 4:
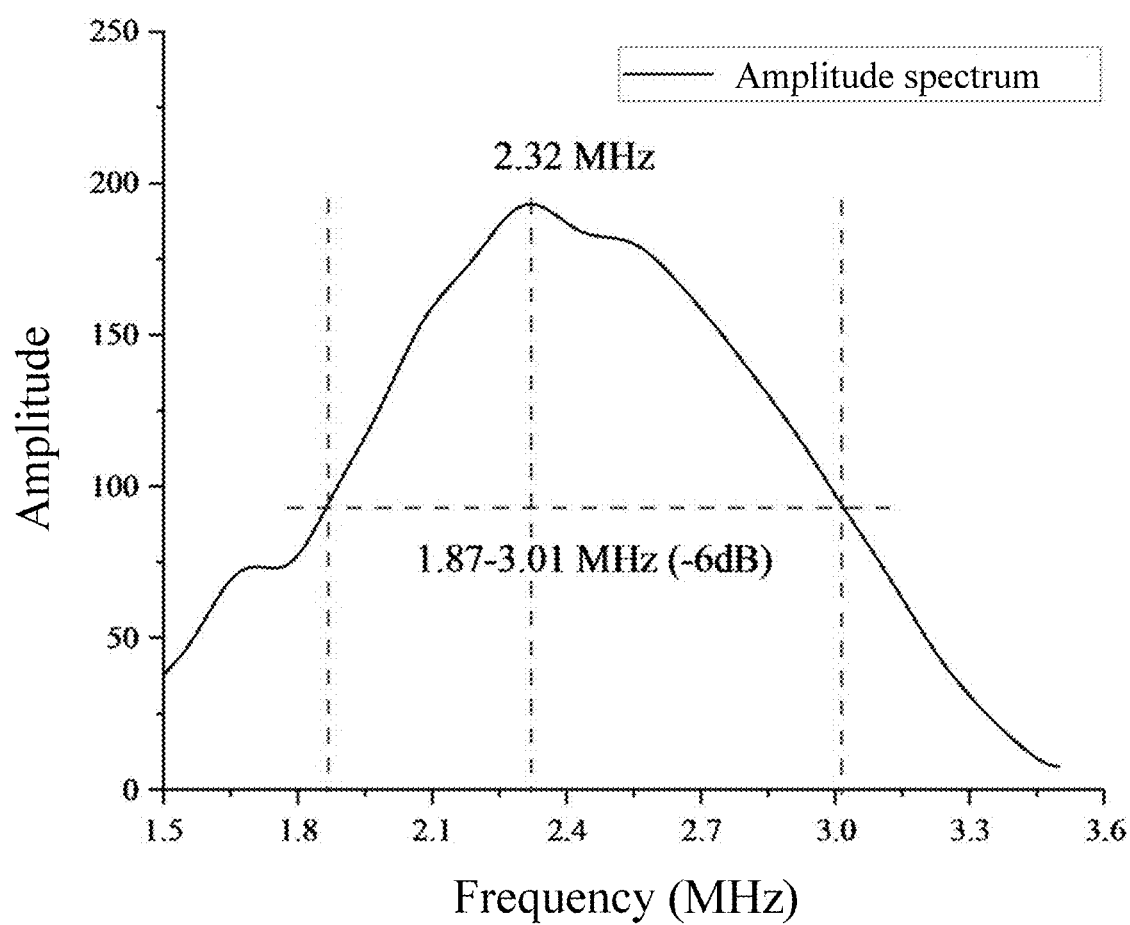
FIG. 4 is a schematic diagram showing a theoretical URCAS.

As shown in FIG. 3 and FIG. 4, data filling is performed on the time-domain reference signal collected from the surface of the delay block probe in the step (e) to improve frequency-domain resolution. Then, FFT is performed to obtain a frequency-domain amplitude spectrum, and a bandwidth at −6 dB of the frequency-domain amplitude spectrum is intercepted as an effective frequency band, ranging from 1.87 MHz to 3.01 MHz. In the step (e), time-domain separation, the zero filling, and the FFT are sequentially performed on reflected waves collected from the upper and lower surfaces of the polymer bearing to obtain an amplitude spectrum $A_{12}(f)$ of the upper and lower interfaces, an amplitude spectrum $A_1(f)$ of the upper interface, and an amplitude spectrum $A_2(f)$ of the lower interface, and then the measured URCAS $\overline{R(f)}$ is calculated according to a following formula:

$$\overline{R(f)} = \frac{A_{12}(f)}{A_1(f)} \tag{6}$$

(i) Constructing an Objective Function

It can be seen from the formula (4) that a reflection coefficient amplitude spectrum of the polymer layer is a function about the sound velocity, the thickness, the density, the attenuation coefficient, and other parameters of the polymer layer. A propagation process of the ultrasonic wave in the polymer bearing is assumed to be a black box system. According to a formula, a mapping matrix between a series of medium parameters and reflection coefficients is constructed, an appropriate objective function is selected to represent a similarity between measured echo data and theoretical calculated echo data, and a parameter inversion problem is converted into an extreme value optimization problem.

A correlation coefficient and a root-mean-square error are selected as the objective function to measure a similarity between a theoretical URCAS and a measured URCAS. The correlation coefficient reflects a similarity between change trends of the measured and the theoretical calculated echo data, and is substituted into the formula (4) to obtain an expression (7) of the correlation coefficient:

$$r_p(c_2, d, \rho, w) = \frac{\sum_{i=1}^{N}\left[R(f; c_2, d, \rho, w) - \overline{R(f; c_2, d, \rho, w)}\right] \left[R(f; c_2, d, \rho, w)^* - \overline{R(f; c_2, d, \rho, w)^*}\right]}{\sqrt{\sum_{i=1}^{N}\left[R(f; c_2, d, \rho, w) - \overline{R(f; c_2, d, \rho, w)}\right]^2 \sum_{i=1}^{N}\left[R(f; c_2, d, \rho, w)^* - \overline{R(f; c_2, d, \rho, w)^*}\right]^2}} \tag{7}$$

In the above expression, N represents a quantity of data points within a frequency domain range after the FFT is performed on a time-domain signal; the subscript i represents an $i^{th}$ frequency value; $R(f;c_2,d,p,w)$ and $R(f;c_2,d,p,w)^*$ respectively represent a measured URCAS and a theoretical URCAS within the effective frequency band; and $\overline{R(f;c_2,d,p,w)}$ and $\overline{R(f;c_2,d,p,w)^*}$ respectively represent arithmetic mean values of the measured URCAS and the theoretical URCAS within the effective frequency band.

If only the correlation coefficient is used as the objective function, without considering a difference between amplitude spectrum values, it is easy to fall into a minimum point in a calculation process. Therefore, the root-mean-square error is introduced as a second constraint, which reflects numerical consistency of the measured and the theoretical calculated echo data, and an expression (8) of the root-mean-square error can be obtained by substituting the measured URCAS $R(f;c_2,d,p,w)$ and theoretical URCAS $R(f;c_2,d,p,w)^*$:

$$\text{RMS}\,E = \sqrt{\frac{1}{N}\sum_{i=1}^{N}[R(f; c_2, d, \rho, w) - R(f; c_2, d, \rho, w)^*]^2} \tag{8}$$

Figure 5A:
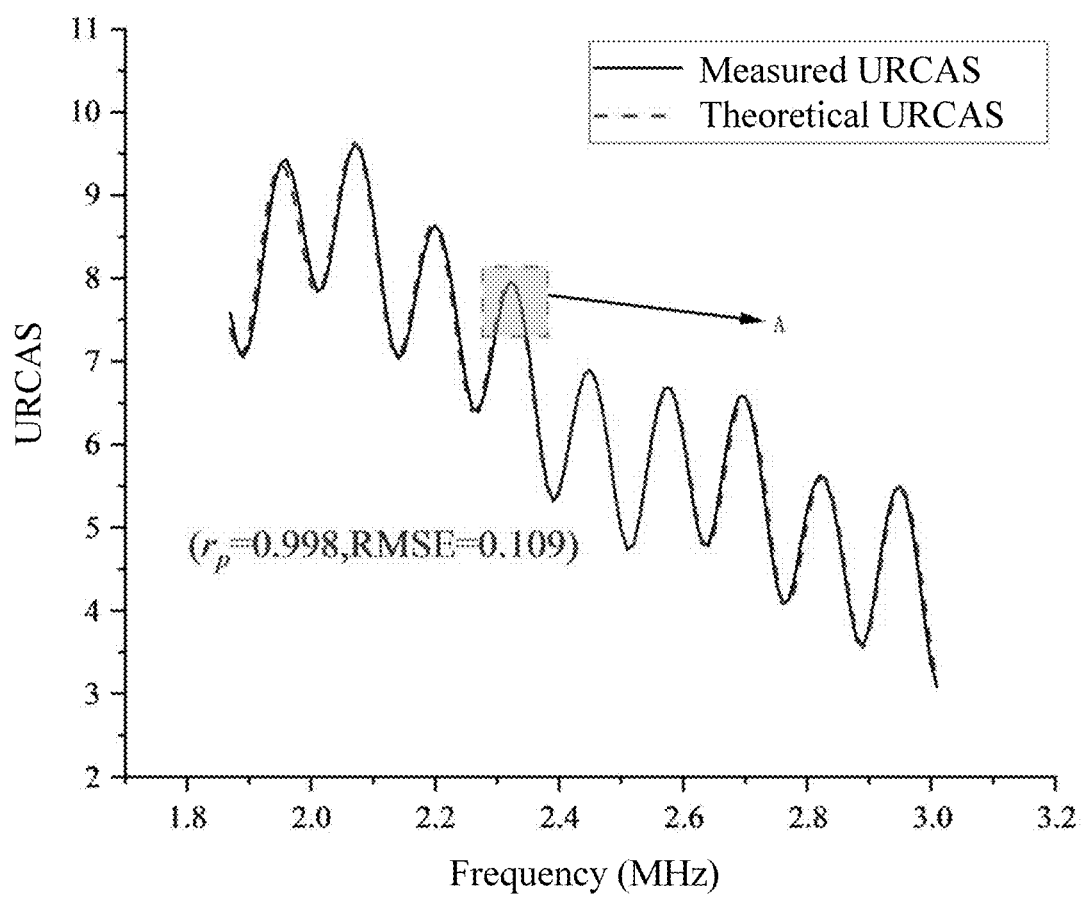
FIG. 5a is a schematic diagram showing a measured URCAS.
Figure 5B:
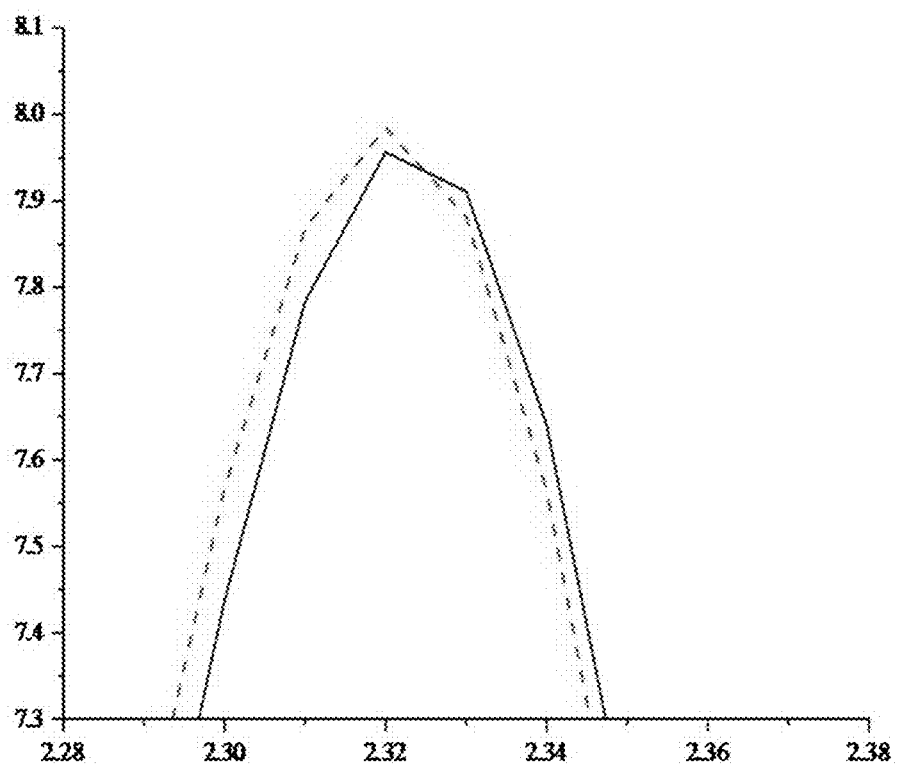

Therefore, when the correlation coefficient is the largest and the root-mean-square error is the smallest, the similarity between the measured URCAS and the theoretical URCAS is the largest, as shown in FIG. 5a and FIG. 5b. In this case, the independent variables corresponding to the objective function are parameters of the polymer bearing.

(j) Solving by Using a Differential Evolution Algorithm

For the constructed objective function, the differential evolution algorithm randomly generates a population $\{X_{1,g}, X_{2,g}, \ldots, X_{NP,g}\}$ containing NP feasible solutions, where an individual $X_{j,g}=(x_{1,g}^j, x_{2,g}^j, \ldots, x_{D,g}^j)$ in the population represents a solution of a problem, D represents a quantity of dimensions of an optimization variable, and g represents a quantity of evolution generations. Each individual is uniformly and randomly determined within a range of $[X_{min}, X_{max}]$, where $X_{min}=(x_{min}^1, x_{min}^2, \ldots, x_{min}^D)$, and $X_{max}=(x_{max}^1, x_{max}^2, \ldots, x_{max}^D)$. This series of random individuals constitute an initial population, which is represented as a formula (9):

$$x_i^j = x_{min}^j + \text{rand}(0,1) \cdot (x_{max}^j - x_{min}^j), j \in [1, D] \tag{9}$$

In the above formula, rand(0,1) represents a real number that is uniformly and randomly determined between 0 and 1.

The differential evolution algorithm realizes individual mutation based on a differential strategy, which is an important symbol different from a genetic algorithm. The classical mutation strategy is randomly selecting two different individuals in the population, and then scaling a vector difference of the two different individuals to perform vector synthesis with the to-be-mutated individuals, where the generated mutation vector $V_{i,g}$ is expressed as a formula (10):

$$V_{i,g} = X_{a,g} + F \cdot (X_{b,g} - X_{c,g}), a \neq b \neq c \neq i \tag{10}$$

In the above formula, $X_{a,g}$, $X_{b,g}$, and $X_{c,g}$ represent three randomly selected individuals in the population, and F represents a scaling factor.

In order to improve a diversity of the population, the differential evolution algorithm introduces a crossover operation, such that at least one component of a test vector comes from the mutation vector, as shown in a formula (11):

$$U_{i,g+1} = \begin{cases} V_{i,g}^j, & \text{if } (\text{rand}^j(0,1) \le CR) \text{ or } (j = j_{rand}) \\ X_{i,g}^j, & \text{otherwise} \end{cases} \tag{11}$$

In the above formula, $\text{rand}^j(0,1)$ represents a uniform random number between 0 and 1 in a $j^{th}$ calculation, CR represents a crossover probability within a range of [0,1], the index $j_{rand}$ represents a randomly selected quantity of dimensions to ensure that the test vector $U_{i,g+1}$ obtains at least one element from $U_{i,g}$, and the crossover operation is referred to as binomial uniform crossover.

The differential evolution algorithm selects a greedy selection strategy, and compares an individual generated through the mutation and crossover operations and a parent individual of the generated individual, where an individual performing well enters a next-generation population, which is expressed as a formula (12):

$$X_{i,g+1} = \begin{cases} U_{i,g+1}, & \text{if } f(U_{i,g+1}) < f(X_{i,g}) \\ X_{i,g}, & \text{otherwise} \end{cases}, i = 1, 2, \ldots, NP \tag{12}$$

After a series of mutation, crossover, and selection operations, new individuals whose quantity is the same as a quantity of individuals forming the next-generation population are generated, a previous-generation population continues to cycle until a termination condition is met, and an optimal result is an obtained thickness parameter of the bearing.

(k) Conducting a Wear Test on the Bearing

Figure 6:
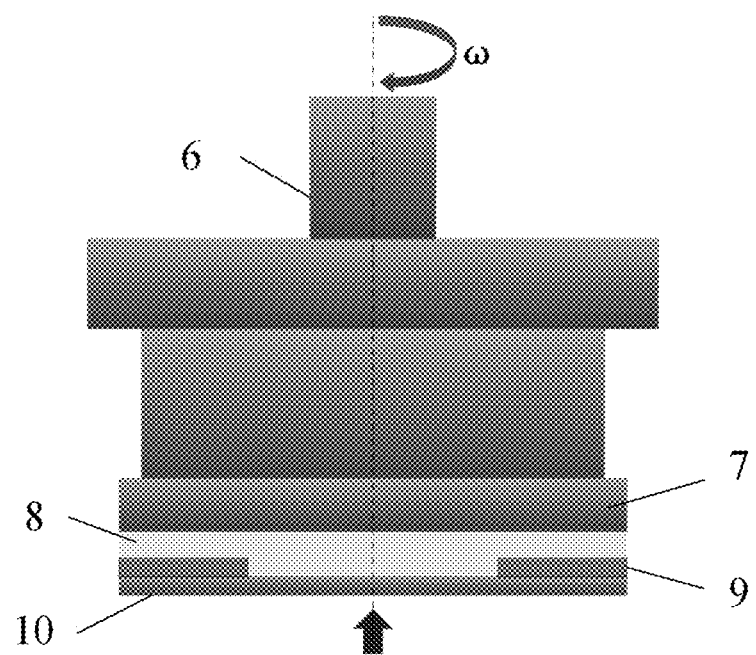
FIG. 6 is a schematic diagram showing a device structure for wear test verification of a wear monitoring method of a polymer thrust bearing based on a URCAS according to the present disclosure.

After a thickness of the bearing before wear is calibrated, the bearing is installed on a water-lubricated vertical bearing test bench shown in FIG. 6. The test bench is constituted by a variable frequency motor (the motor is connected to a torque meter by using a shaft, and the torque meter is connected to a rotating spindle 6), the torque meter, a test chamber, a loading module (including a PEEK thrust pad 9 and a support ring 10, which are placed on a same pallet, and the pallet is driven by a hydraulic cylinder to achieve loading), and a lubricating medium 8. Then, the wear test is conducted, and the thickness is calibrated each hour by disassembling the pad. A thickness at a center of the bearing is measured and recorded using an ultrasonic testing system and a high precision spiral micrometer respectively. A collection process of the ultrasonic signal is consistent with that in the step (e).

(l) Calculating a Wear Magnitude of the Bearing

Figure 7:
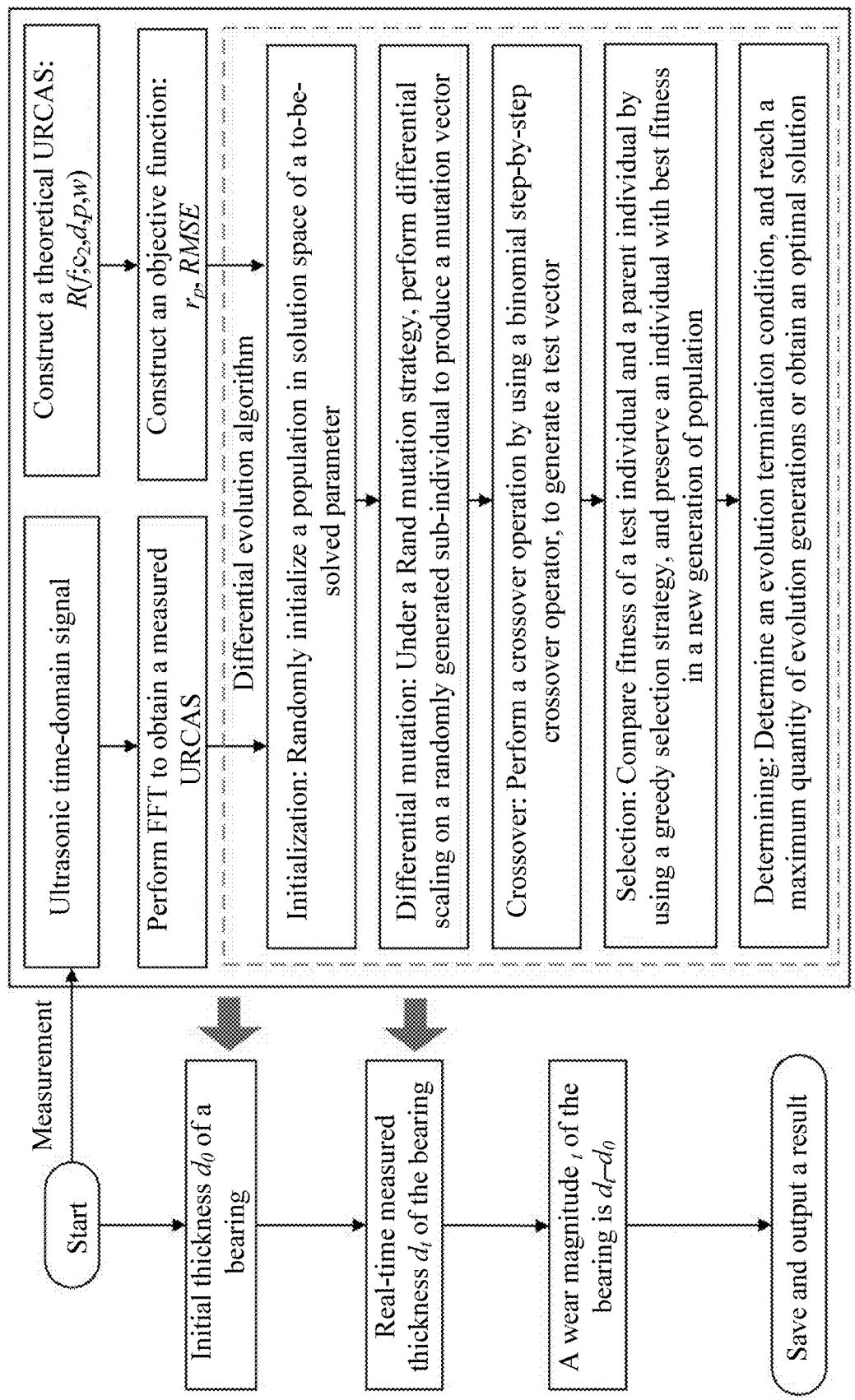
FIG. 7 is a flow block diagram showing wear magnitude calculation of a polymer bearing according to the present disclosure.

A calculation process is shown in FIG. 7. According to the steps (f) to (j), the physical and chemical parameters at the measured point of the polymer bearing can be calculated based on each ultrasonic signal collected after the bearing wears. A difference between a real-time thickness $d_t$ and a pre-wear thickness $d_0$ at the measured point is a linear thickness wear magnitude $\delta_t$ of the bearing.

An inversion result and error of this embodiment are shown in Table 1. An absolute error between a thickness inversion result of the polymer bearing and the calibrated thickness is 6 μm to 63 μm, a relative error is 0.06% to 0.66%, and a standard deviation between ten inversion operations is 55 μm to 94 μm, which meet an engineering inspection requirement. Therefore, the correctness of this monitoring method is verified.

TABLE 1

Thickness inversion result and error of the polymer bearing

| Wear time (h) | Measured thickness of the bearing (μm) | Inverted thickness of the bearing (μm) | Inversion standard deviation (μm) | Absolute error (μm) | Relative error (%) |
|---|---|---|---|---|---|
| 0 | 10299 | 10314 | 81 | 15 | 0.14565 |
| 1 | 10299 | 10305 | 63 | 6 | 0.05826 |
| 2 | 10214 | 10238 | 55 | 24 | 0.23497 |
| 3 | 10076 | 10084 | 81 | 8 | 0.0794 |
| 4 | 10011 | 10003 | 94 | 8 | 0.07991 |
| 5 | 9892 | 9884 | 65 | 8 | 0.08087 |
| 6 | 9794 | 9745 | 78 | 49 | 0.50031 |
| 7 | 9672 | 9725 | 87 | 53 | 0.54797 |
| 8 | 9541 | 9604 | 75 | 63 | 0.66031 |
| 9 | 9111 | 9142 | 88 | 31 | 0.34025 |
| 10 | 8742 | 8770 | 69 | 28 | 0.32029 |

The wear monitoring method of a polymer thrust bearing based on a URCAS in this embodiment has following beneficial effects:

1. At present, non-in-situ monitoring is traditionally performed to monitor wear of a bearing. In the non-in-situ monitoring, the bearing needs to be disassembled, and an electronic scale or a measuring tool is used to measure a mass wear magnitude or thickness wear magnitude. The process is cumbersome and a measured value is discrete. The present disclosure adopts an ultrasonic method to measure a wear thickness of a polymer bearing. Firstly, the ultrasonic method avoids requirements of electrical and optical methods for conductivity and transparency of the polymer bearing. Secondly, the ultrasonic method has a potential to achieve the in-situ wear monitoring on a back of the bearing, and a thickness of the bearing can be measured without a need to disassemble the bearing.

2. An ultrasonic time-domain method relies on accurate prior knowledge of a sound velocity and a time-domain waveform with a high signal-to-noise ratio. However, the polymer bearing is added with other components to enhance the performance during the production process, and hence the polymer bearing has the features of a large sound attenuation, a low echo signal-to-noise ratio, an uneven temperature distribution during operation, and a difficulty in determining a propagation speed of a sound wave. In addition, there is a thermoelastic deformation in the bearing, and both geometric and physical parameters are variable. Therefore, the present disclosure uses a URCAS to convert a calculation process to a frequency domain, and combines a differential evolution algorithm to simultaneously invert the sound velocity, the thickness, the density, and the attenuation factor, without the accurate prior knowledge, and is environmentally friendly.

3. Different from a calibration result of a high precision spiral micrometer, a calculation result obtained by the monitoring method has an absolute error of less than 100 μm and a relative error of less than 1%, which meets an engineering inspection requirement. Therefore, the monitoring method has high promotion value.

The foregoing is merely preferable embodiments of the present disclosure without limitation on the scope of the present disclosure. Any equivalent structure change made under the teaching of the description and the accompanying drawings of the present disclosure, or direct or indirect application thereof in other related technical fields, shall still fall in the protection scope of appended claims.

What is claimed is:

1. A wear monitoring method of a polymer thrust bearing based on an ultrasonic reflection coefficient amplitude spectrum (URCAS), comprising following steps:

selecting a corresponding delay block probe based on a material of a to-be-tested bearing, setting corresponding parameters of a pulse generator, connecting the delay block probe to the pulse generator, and connecting the pulse generator to a digital oscilloscope;

after collecting a primary echo from a surface of the delay block probe as a reference signal, placing the delay block probe in a designated region on a back of the to-be-tested bearing, and collecting time-domain echo signals from upper and lower surfaces of the bearing;

establishing a propagation model of an ultrasonic signal in a polymer bearing, and calculating a theoretical URCAS based on the propagation model;

calculating a measured URCAS based on the time-domain echo signals collected from the upper and lower surfaces of the bearing; and constructing an objective function based on the measured URCAS and the theoretical URCAS to represent a similarity between measured echo data and theoretical calculated echo data, and solving the objective function by using a differential evolution algorithm, wherein when a correlation coefficient is largest and a root-mean-square error is smallest, a similarity between the measured URCAS and the theoretical URCAS is largest, and in this case, independent variables corresponding to the objective function are parameters of the polymer bearing; wherein during calculation of the theoretical URCAS, a reflection coefficient R of a polymer layer is expressed as follows:

$$R = \frac{P_1 + P_2}{P_1} = \frac{r_{12} + t_{12}r_{23}t_{21}\exp(-2\alpha d)\cos\left(\frac{4\pi f d}{c_2}\right)}{r_{12}} + i\frac{t_{12}r_{23}t_{21}\exp(-2\alpha d)\sin\left(\frac{4\pi f d}{c_2}\right)}{r_{12}}$$

the reflection coefficient R of the polymer layer is a complex number, a modulus of the reflection coefficient is a function of a frequency, and the function is referred to as the URCAS, which is expressed as follows:

$$R(f) = \sqrt{\left\{\left[r_{12}^2 + 2r_{12}r_{23}(1 - r_{12}^2)\exp(-2\alpha d)\cos\left(\frac{4\pi f d}{c_2}\right) + \sqrt{r_{23}^2(1 - r_{12}^2)^2 \exp(-4\alpha d)}\right]/r_{12}^2\right\}}$$

an attenuation coefficient of the polymer layer is expressed as follows:

$$\alpha(f) = \frac{1}{2d}\ln\left[\frac{(1 - r_{12}^2)r_{23}A_1(f)}{r_{12}A_2(f)}\right] = \frac{1}{2d}\ln\left[w \cdot \frac{A_1(f)}{A_2(f)}\right]$$

wherein $A_1(f)$ and $A_2(f)$ respectively represent amplitude spectra of reflection echoes on upper and lower interfaces of the polymer layer, and w represents an attenuation factor.

2. The wear monitoring method according to claim 1, wherein the setting corresponding parameters of the pulse generator comprises setting a pulse repetition frequency (PRF), pulse energy, a damping, a gain, and a filter bandwidth.

3. The wear monitoring method according to claim 1, wherein when the propagation model of the ultrasonic signal in the polymer bearing is established, the bearing is simplified into a homogeneous and smooth layered material, a medium I is a delay block, a medium II is a layered polymer material, a medium III is air or water, acoustic impedance of the medium I, the medium II, and the medium III is Z1, Z2, and Z3 respectively, the acoustic impedance is numerically equal to a density of the medium multiplied by a sound velocity, and when an ultrasonic pulse wave with a sound pressure of 1 and a frequency of f is perpendicularly incident into a three-layer medium along a negative direction of a z axis, a received reflected wave is expressed as follows:

$$\begin{cases} P_1 = r_{12} \\ P_2 = r_{23}t_{12}t_{21}\exp(2ik_{2z}d) \\ P_3 = r_{23}^2 t_{12}r_{21}t_{21}\exp(4ik_{2z}d) \\ \cdots\cdots \\ P_n = r_{23}^n t_{12} r_{21}^{n-1} t_{21}\exp[2(n-1)ik_{2z}d], \ k_{2z} = \frac{2\pi f}{c_2} + i\alpha \end{cases}$$

wherein $P_1$ represents the reflected echo of the upper interface of the polymer layer, $P_2$ represents a sound wave transmitted into the polymer layer and transmitted from the upper interface after being reflected once on the lower interface, $P_3$ represents a sound wave transmitted into the polymer layer and transmitted from the upper interface after being reflected twice on the lower interface, $P_n$ represents a sound wave transmitted into the polymer layer and transmitted from the upper interface after being reflected n times on the lower interface, $r_{12}$ and $r_{23}$ respectively represent reflection coefficients of the polymer layer when an ultrasonic wave is propagated to interfaces 1 and 2 along the negative direction of the z axis, $r_{21}$ represents a reflection coefficient of the polymer layer when the ultrasonic wave is propagated to the interface 1 along a positive direction of the z axis, $t_{12}$ and $t_{21}$ respectively represent coefficients of transmitting the sound pressure along different directions on the interface 1, n represents a quantity of reflection echoes, d and $c_2$ respectively represent a thickness and a sound velocity of the polymer layer, α represents the attenuation coefficient of the polymer layer, $k_{2z}$ represents a quantity of waves along a z direction in the polymer layer, exp ($2ik_{2z}d$) represents a phase change of the sound wave after one round trip in the polymer layer, exp ($4ik_{2z}d$) represents a phase change of the sound wave after two round trips in the polymer layer, and exp($2(n-1)k_{2z}d$) represents a phase change of the sound wave after (n−1) round trips in the polymer layer.

4. The wear monitoring method according to claim 1, wherein when the measured URCAS is calculated, zero filling and fast fourier transform (FFT) are performed on the reference signal collected from the delay block probe to obtain a frequency-domain amplitude spectrum, a bandwidth at −6 dB of the frequency-domain amplitude spectrum is intercepted as an effective frequency band, time-domain separation, the zero filling, and the FFT are sequentially performed on reflected waves collected from the upper and lower surfaces of the polymer bearing to obtain an amplitude spectrum $A_{12}(f)$ of the upper and lower interfaces, the amplitude spectrum $A_1(f)$ of the upper interface, and the amplitude spectrum $A_2(f)$ of the lower interface, and then the measured URCAS $\overline{R(f)}$ is calculated according to the following formula:

$$\overline{R(f)} = \frac{A_{12}(f)}{A_1(f)}.$$

5. The wear monitoring method according to claim 1, wherein when the objective function is constructed to represent the similarity between the measured echo data and the theoretical calculated echo data, the correlation coefficient and the root-mean-square error are selected as the objective function to measure the similarity between the theoretical URCAS and the measured URCAS, and the correlation coefficient reflects a similarity between change trends of the measured and the theoretical calculated echo data, and a formula of the URCAS is substituted to obtain an expression of the correlation coefficient:

$$r_p(c_2, d, \rho, w) = \frac{\sum_{i=1}^{N}\left[R(f; c_2, d, \rho, w) - \overline{R(f; c_2, d, \rho, w)}\right] \left[R(f; c_2, d, \rho, w)^* - \overline{R(f; c_2, d, \rho, w)^*}\right]}{\sqrt{\sum_{i=1}^{N}\left[R(f; c_2, d, \rho, w) - R(f; c_2, d, \rho, w)\right]^2} \sqrt{\sum_{i=1}^{N}\left[R(f; c_2, d, \rho, w)^* - \overline{R(f; c_2, d, \rho, w)^*}\right]^2}}$$

wherein N represents a quantity of data points within a frequency domain range after the FFT is performed on a time-domain signal; subscript i represents an $i^{th}$ frequency value; $R(f;c_2, d, \rho, w)$ and $R(f;c_2, d, \rho, w)^*$ respectively represent a measured URCAS and a theoretical URCAS within an effective frequency band; and $\overline{R(f;c_2,d,\rho,w)}$ and $\overline{R(f;c_2,d,\rho,w)^*}$ respectively represent arithmetic mean values of the measured URCAS and the theoretical URCAS within the effective frequency band, and $\rho$ represents a density of the polymer layer; the root-mean-square error is introduced as a second constraint, which reflects numerical consistency of the measured and the theoretical calculated echo data, and an expression of the root-mean-square error is obtained by substituting the measured URCAS $R(f;c_2, d, \rho, w)$ and theoretical URCAS $R(f;c_2, d, \rho, w)^*$:

$$RMSE = \sqrt{\frac{1}{N}\sum_{i=1}^{N}[R(f;c_2,d,\rho,w) - R(f;c_2,d,\rho,w)^*]^2}$$

when the correlation coefficient is the largest and the root-mean-square error is the smallest, the similarity between the measured URCAS and the theoretical URCAS is the largest, and in this case, the independent variables corresponding to the objective function are the parameters of the polymer bearing.

6. The wear monitoring method according to claim 1, wherein the solving the objective function by using the differential evolution algorithm comprises:
   initialization: randomly initializing a population in solution space of a to-be-solved parameter;
   differential mutation: under a Rand mutation strategy, performing differential scaling on a randomly generated sub-individual to produce a mutation vector;
   crossover: performing a crossover operation by using a binomial step-by-step crossover operator to generate a test vector;
   selection: comparing fitness of a test individual and a parent individual by using a greedy selection strategy, and preserving an individual with best fitness in a new-generation population; and
   determining: determining an evolution termination condition, and reaching a maximum quantity of evolution generations or obtaining an optimal solution.

7. The wear monitoring method according to claim 6, wherein when the objective function is solved by using the differential evolution algorithm,
   for the constructed objective function, the differential evolution algorithm randomly generates a population $\{X_{1,g}, X_{2,g}, \ldots, X_{NP,g}\}$ containing NP feasible solutions, wherein g represents a quantity of evolution generations, NP represents a quantity of feasible solutions, and X represents a representation symbol of the individual in the population; an individual $X_{j,g}=(x_{1,g}^j, x_{2,g}^j, \ldots x_{D,g}^j)$ in the population is used to represent a solution of a problem, wherein D represents a quantity of dimensions of an optimization variable, and g represents the quantity of evolution generations; and each individual is uniformly and randomly determined within a range of $[X_{min}, X_{max}]$, wherein $X_{min}=(x_{min}^1, x_{min}^2, \ldots, x_{min}^D)$, $X_{max}=(x_{max}^1, x_{max}^2, \ldots, x_{max}^D)$, and a series of random individuals constitute an initial population, which is expressed by the following formula:

$$x_i^j = x_{min}^j + rand(0,1) \cdot (x_{max}^j - x_{min}^j), j \in [1,D]$$

wherein rand (0,1) represents a real number that is uniformly and randomly determined between 0 and 1;
the differential evolution algorithm realizes individual mutation based on a differential strategy, randomly selects two different individuals in the population based on a classic mutation strategy, and then scales a vector difference of the two different individuals to perform vector synthesis with the to-be-mutated individuals, wherein the generated mutation vector $V_{i,g}$ is expressed by the following formula:

$$V_{i,g} = X_{a,g} + F \cdot (X_{b,g} - X_{c,g}), a \neq b \neq c \neq i$$

wherein $X_{a,g}$, $X_{b,g}$, and $X_{c,g}$ represent three randomly selected individuals in the population, and F represents a scaling factor;
the differential evolution algorithm introduces the crossover operation, such that at least one component of the test vector comes from the mutation vector, as shown in the following formula:

$$U_{i,g+1} = \begin{cases} V_{i,g}^j, & \text{if } (rand^j(0,1) \leq CR) \text{ or } (j = j_{rand}) \\ X_{i,g}^j, & \text{otherwise} \end{cases}$$

wherein $rand^j(0,1)$ represents a uniform random number between 0 and 1 in a $j^{th}$ calculation, CR represents a crossover probability within a range of [0, 1], the index $j_{rand}$ represents a randomly selected quantity of dimensions to ensure that the test vector $U_{i,g+1}$ obtains at least one element from $U_{i,g}$, and the crossover operation is referred to as binomial uniform crossover;
the differential evolution algorithm selects the greedy selection strategy, and compares an individual generated through the mutation and crossover operations and a parent individual of the generated individual, wherein an individual performing well enters a next-generation population, which is expressed by the following formula:

$$X_{i,g+1} = \begin{cases} U_{i,g+1}, & \text{if } f(U_{i,g+1}) < f(X_{i,g}) \\ X_{i,g}, & \text{otherwise} \end{cases}, i = 1, 2, \ldots, NP$$

after mutation, crossover, and selection operations, new individuals next-generation population are generated in a same form and a same number for the next-generation population, a previous-generation population continues to cycle until the termination condition is met, and an optimal result is an obtained thickness parameter of the bearing.

\* \* \* \* \*